UNITED STATES PATENT OFFICE.

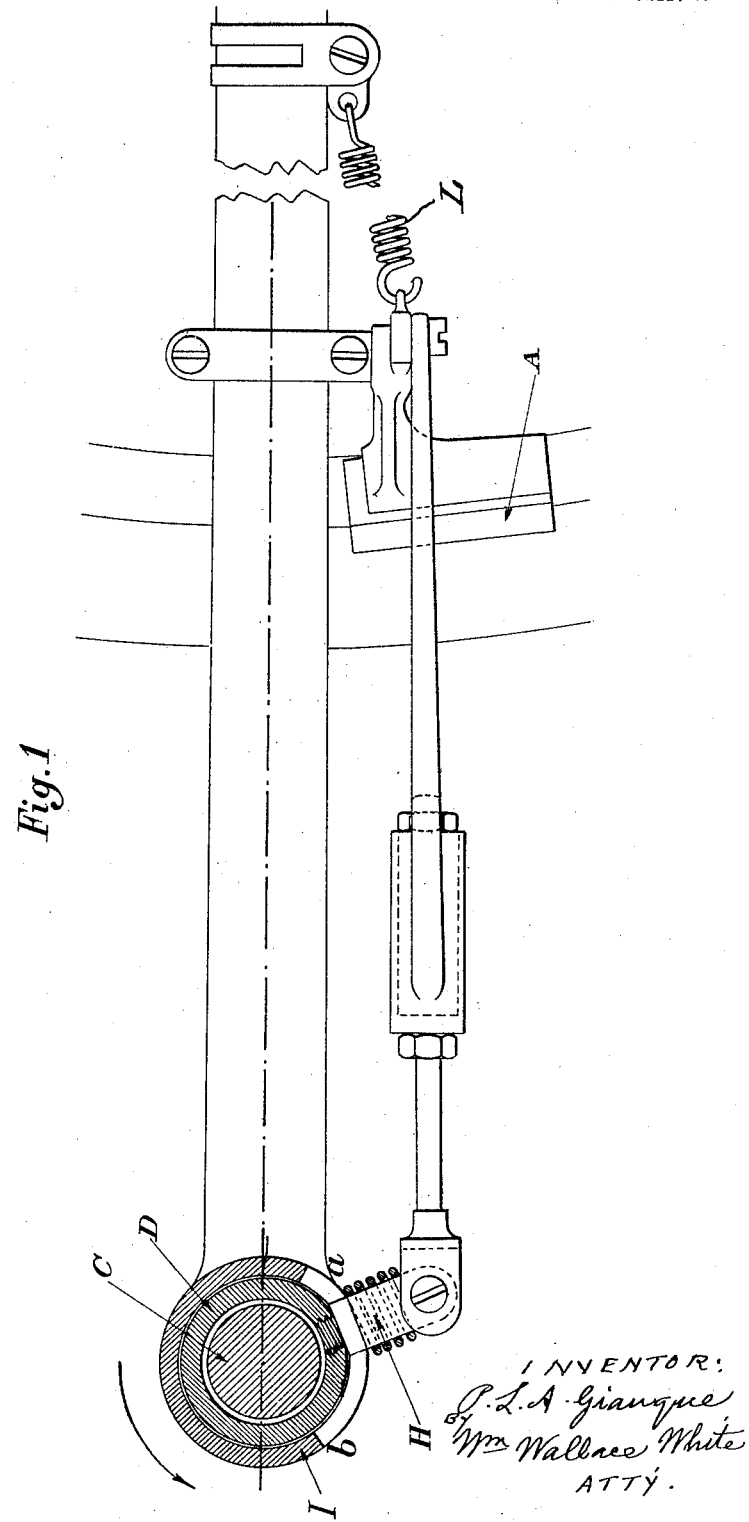

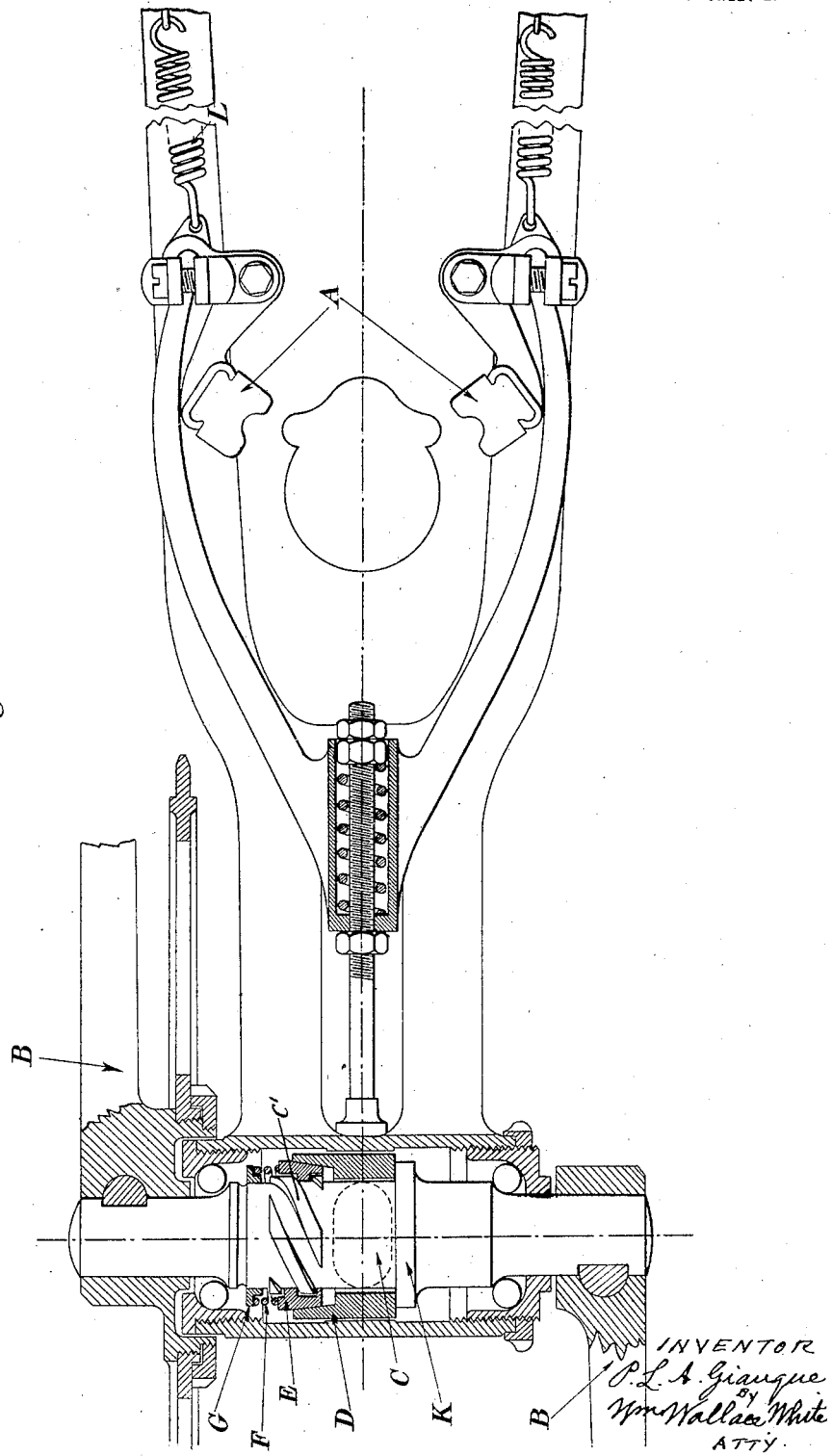

PIERRE LOUIS ALFRED GIAUQUE, OF LEVALLOIS-PERRET, FRANCE, ASSIGNOR TO SOCIETE ANONYME DES AUTOMOBILES ET CYCLES PEUGEOT, OF PARIS, FRANCE.

BACK-PEDALING BRAKE FOR VELOCIPEDES.

1,382,902.                Specification of Letters Patent.    Patented June 28, 1921.

Application filed December 23, 1919. Serial No. 346,938.

*To all whom it may concern:*

Be it known that I, PIERRE LOUIS ALFRED GIAUQUE, a citizen of the Republic of Switzerland, residing at 80 Rue Danton, Levallois-Perret, Seine, in the Republic of France, have invented new and useful Improvements in Back-Pedaling Brakes for Velocipedes, of which the following is a specification.

This invention relates to an improved brake for free wheel bicycles which is operated by back pedaling.

In the annexed drawing given by way of example:

Figure 1 is a sectional elevation view partly in elevation of a bicycle brake constructed in accordance with the invention.

Fig. 2 is a horizontal section partly in plan view.

As shown in the drawing, the pedal cranks B are keyed on the shaft or axle C which is provided with an annular shoulder K. The shaft C is provided with screw threads $C^1$ (Fig. 2) which are right hand threads in the embodiment shown.

With the threads $C^1$ engages a nut E provided with a conical outer surface which may engage into a correspondingly shaped recess formed in a sleeve D which may have an angular rotary movement within the bracket or casing I.

A coil spring F bearing against a thrust ring G secured to the axle tends to force the nut E into the sleeve D. Secured to the sleeve D, is a radial arm H which is connected by a link arrangement to the brake shoes A. The arm H may oscillate in a slot $a\ b$ formed in the bracket I.

The operation is as follows:

In normal running, the axle rotating in the direction of the arrow (Fig. 1) tends to carry around the nut E through the medium of the screw threads $C^1$ but the nut E being prevented from rotating by its frictional contact with the sleeve D, screws itself upon the screw threads $C^1$ and is thus displaced toward the thrust ring G thereby compressing the spring F. The nut E rotates then with the axle.

When the rotation of the axle is reversed, the nut E is moved by the screw threads $C^1$ toward the sleeve D and the latter being prevented from moving axially by the collar or shoulder K on the axle C, the nut E and the sleeve D become coupled together so that the sleeve D rotates with the axle, in a direction opposite to the arrow in Fig. 1. The arm H on the sleeve D will thus oscillate within the slot $a\ b$ and act to set the brakes.

When forward pedaling is resumed, if the three parts C, E, D remain temporarily locked to each other, the sleeve D will rotate in the direction of the arrow (said rotation being enhanced by the action of the brake springs L), until the arm H comes into contact with the end $a$ of the slot $a\ b$ in the casing, I, when the operation as described above takes place again.

While I have described in detail the structure herein illustrated, it is to be understood that I do not thereby limit my invention to the precise features of construction shown, as I am aware that many mechanical changes and modifications may be made therein without departing from the spirit and scope of the invention as set forth in the claim appended hereto.

Having now described my invention, what I claim as new and desire to secure by Letters Patent is:

A back pedaling brake for velocipedes comprising in combination an axle adapted to be rotated in either forward or reverse direction, a helical projection on said axle, a nut member in engagement with said helical projection and having a conical coupling surface, a sleeve having a complementary coupling surface adapted to frictionally engage with the conical surface on the nut member, means for rotatively supporting the said sleeve so that it may have a limited angular movement, means for preventing any axial displacement of said sleeve, yielding means adapted to bring the nut member into engagement with the sleeve, braking members, and means for operatively connecting the said sleeve to the said braking members.

In testimony whereof I have signed my name to this specification.

PIERRE LOUIS ALFRED GIAUQUE.